United States Patent
Barlow

[15] 3,647,528
[45] Mar. 7, 1972

[54] POLYVINYL ALCOHOL COATING COLORS

[72] Inventor: David O. Barlow, Wilmington, Del.
[73] Assignee: E. I. du Pont de Nemours and Company, Wilmington, Del.
[22] Filed: Jan. 7, 1970
[21] Appl. No.: 1,157

[52] U.S. Cl..............117/155 UA, 260/29.6 B, 260/91.3 PV
[51] Int. Cl........................................D21h 1/32, C08f 29/26
[58] Field of Search ......................260/29.6 B, 13, 91.3 PV; 117/155 UA

[56] References Cited

UNITED STATES PATENTS

| | | | |
|---|---|---|---|
| 3,087,920 | 4/1963 | Suzumura et al. | 260/91.3 |
| 3,218,183 | 11/1965 | Fritzschung et al. | 117/15 |
| 3,298,987 | 1/1967 | Colgan et al. | 260/29.6 |

FOREIGN PATENTS OR APPLICATIONS 794,420  9/1968  Canada

OTHER PUBLICATIONS

Matsumoto, J. Polym. Sci. 31, 225(1958) 225–226.
Beresniewicz, J. Polym. Sci. 39, 67–68(1959)
Tsunemitsu et al., S.C.I. Monograph No. 30, 111, 113, 115 (1968)
Colgan et al., TAPPI Monograph Series No. 25, 117–128(1963)
Richardson, TAPPI Monograph Series No. 28, 57–60(1964)
Argana et al., in Water–Soluble Resins (Ed. by Davidson et al.), Reinhold, New York 1962, pages 109–110, 112, 121.

*Primary Examiner*—Melvin Goldstein
*Attorney*—Ivan G. Szanto

[57] ABSTRACT

Polyvinyl alcohol having a 4 percent solution viscosity at 20° C. in the range of 7.5 to 16 centipoises is uniquely adapted to function as the sole pigment binder in paper coating colors and to improve the rheological properties thereof.

7 Claims, 1 Drawing Figure

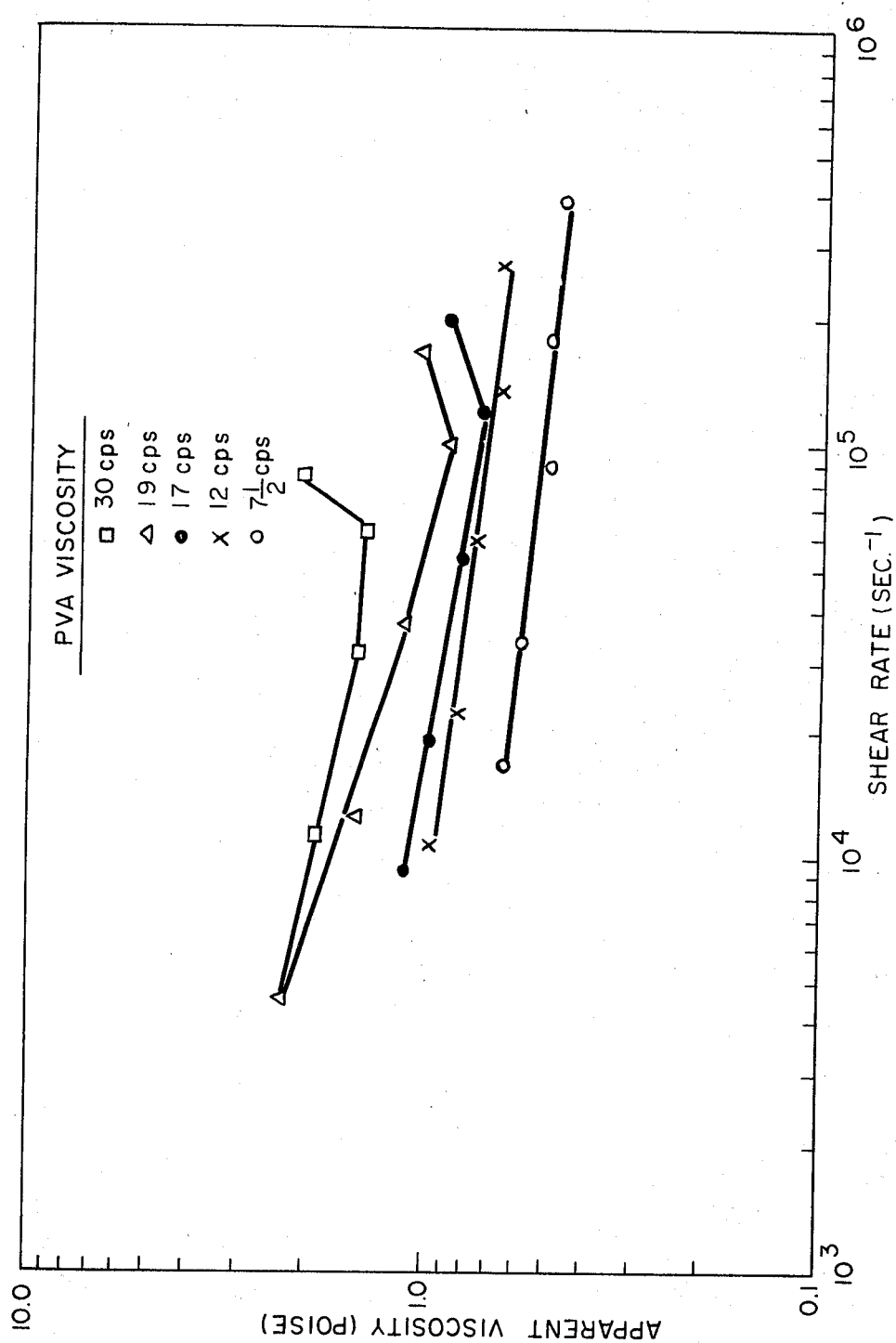

POLYVINYL ALCOHOL COATING COLORS

BACKGROUND OF THE INVENTION

1. Field of the Invention

This invention relates to polyvinyl alcohol compositions and, particularly, to improved coating colors containing polyvinyl alcohol compositions as the pigment binder. More particularly, the invention concerns the use of polyvinyl alcohol compositions to provide coating colors exhibiting improved rheological properties. The invention also concerns the use of polyvinyl alcohol compositions to provide an improved method of applying coating colors to cellulosic substrates and to the coated cellulosic substrates produced thereby.

2. Description of the Prior Art

Within the last decade or so the consumption of polyvinyl alcohol has been constantly on the increase. This is in no small part the result of a more widespread acceptance by the paper industry of polyvinyl alcohol as a suitable substitute for such natural or nonsynthetic materials as starch, casein, soy protein, and the like. Polyvinyl alcohol has been shown to be most effective as a surface size for cellulosic substrates, such as paper and paperboard, and provides an efficient grease-barrier coating. In addition, polyvinyl alcohol has been used to improve the wet and dry strength of cellulosic substrates. However, the serious development of polyvinyl alcohol for other than specialty uses has been limited. The use of polyvinyl alcohol as a binder in coating colors would represent a significant departure from specialty uses and would constitute the realization of a significantly large market potential.

While polyvinyl alcohol has been considered, at various times, as a coating color binder, it is only of late that serious consideration has been given thereto.

In U.S. Pat. No. 3,298,987 issued Jan. 17, 1967 to Colgan et al., coating colors are disclosed which employ polyvinyl alcohol as a binder in combination with a synthetic polymer latex, glyoxal and a filler, such as clay. The patentees indicate that the polyvinyl alcohol suitable for use as their binder can be hydrolyzed to the extent of 55 to 100 percent and can have a 4 percent aqueous solution viscosity at 20° C. in the range of about 2 to 150 centipoises. The preferred polyvinyl alcohol is indicated as being highly hydrolyzed and of the medium viscosity type, i.e., having a viscosity of 20 to 40 centipoises. The patentees, as authors of the article entitled "The Use of Polyvinyl Alcohol as a Color Coating Adhesive," published in TAPPI, Vol. 44, No. 11, Page 818 (November, 1961), point out that polyvinyl alcohol colors "were found to exhibit rheological properties typical, depending on solids content, of Newtonian and shear-thinning fluids; and solids-viscosity relationships similar, in view of low binder requirement, to colors prepared from the more typical commercial binders." A principal advantage of the polyvinyl alcohol coating colors, as set forth in the patent, is their ability to flow smoothly and evenly so that they can be applied to a cellulosic web at sufficiently high speeds to be economical in ordinary coating processes.

Canadian Pat. No. 794,420 issued Sept. 10, 1968 and assigned to Nippon Gosei also discloses coating colors wherein polyvinyl alcohol is used as the pigment binder. The patentees employ a special grade of polyvinyl alcohol to achieve the advantages alleged. The particular polyvinyl alcohol used is alleged to be a special grade characterized in that it contains 3 to 7 percent by mole of acetyl group, i.e., a degree of hydrolysis of 97 to 93 percent, and has a degree of polymerization of about 700 to 1,300. The latter property is indicated as meaning average degree of polymerization calculated from the intrinsic viscosity of the polyvinyl alcohol, although no method of calculation is disclosed. The patentees allege that an aqueous pigment composition containing their special grade of polyvinyl alcohol may be stable for aging without any coagulation or gelation, may show excellent coatability on paper coating, and may give a smooth, glossy, pattern-free, moisture- or water-resistant, pick-resistant and successfully printable coated surface free from any discoloration or peeling of the coating layer.

British Patent No. 1,111,954 published May 1, 1968 and assigned to Kurashiki Rayon discloses a pigment coating composition for paper comprising a pigment filler, such as clay, a dispersing agent, such as sodium hexametaphosphate, a polyvinyl alcohol binder and an auxiliary binder or adhesive in the form of a latex, such as styrene-butadiene latex. The patent teaches that the use of flow modifier, such as carboxymethylcellulose, normally employed in paper coating colors to insure a uniform and flat covered surface, may be dispensed with by using polyvinyl alcohol having a polymerization degree of less than 1,200 as the pigment binder in combination with a latex auxiliary adhesive. The later component is disclosed as an essential component of the patented compositions, its presence being described as necessary to compensate for the reduction in adhesive strength occasioned by the reduction in polymerization degree of the polyvinyl alcohol employed as the pigment binder.

While the state of the art, as evidenced by the aforementioned patents, indicates an awareness of the utilitarian function of polyvinyl alcohol as a pigment binder in coating colors, the art has not kept pace with the improved capability of the high-speed machinery and equipment in the paper making industry. In the economical operation of such machinery and equipment, coating colors are applied to cellulosic substrates at very high shear rates, the limits thereof being essentially determined by the occurrence of dilatant flow, i.e., increase of viscosity with increase in shear rate. The dilatancy is evidenced by a thickening of the coating colors with increased shear rate and is undesirable because of the resulting nonuniformity in coating properties.

Accordingly, there is a pressing need for coating colors utilizing polyvinyl alcohol as a pigment binder which exhibit improved rheological properties and which are capable of behaving as a pseudoplastic system, i.e., decrease in viscosity with increase in shear rate.

SUMMARY OF THE INVENTION a. The invention relates to a dry, water-soluble polyvinyl alcohol characterized by a degree of hydrolysis of at least about 99 percent and by a 4 percent aqueous solution viscosity at 20° C. in the range of about 7.5 to 16 centipoises, said polyvinyl alcohol being adapted to function as sole pigment binder in an aqueous coating color system characterized by pseudoplastic flow at shear rates of the order of $10^5$ sec.$^{-1}$.

b. The invention also relates to an aqueous solution of a water-soluble polyvinyl alcohol characterized by a degree of hydrolysis of at least about 99 percent and by a 4 percent aqueous solution viscosity at 20° C. in the range of about 7.5 to 16 centipoises, said polyvinyl alcohol being adapted to function as sole pigment binder in an aqueous coating color system characterized by pseudoplastic flow at shear rates of the order of $10^5$ sec.$^{-1}$.

c. The invention further relates to an improvement in an aqueous coating color comprising a pigment filler and a binder therefor wherein the binder consists of water-soluble polyvinyl alcohol characterized by a degree of hydrolysis of at least about 99 percent and by a 4 percent aqueous solution viscosity at 20° C. in the range of about 7.5 to 16 centipoises, said polyvinyl alcohol being adapted to function as sole pigment binder in an aqueous coating color system characterized by pseudoplastic flow at shear rates of the order of $10^5$ sec.$^{-1}$.

d. The invention also contemplates a method for improving the rheological properties of an aqueous coating color comprising a pigment filler and a polyvinyl alcohol binder therefor, said method comprising utilizing as said polyvinyl alcohol binder a polyvinyl alcohol having a 4 percent aqueous solution viscosity at 20° C. in the range of about 7.5 to 16 centipoises.

e. The invention further contemplates an improvement for permitting application of a coating color comprising a clay filler and a polyvinyl alcohol binder to a cellulosic substrate at a shear rate of at least $10^5$ sec.$^{-1}$, the improvement comprising employing as the binder polyvinyl alcohol having a 4 percent aqueous solution viscosity at 20° C. in the range of about 7.5 to 16 centipoises.

f. Another embodiment of the invention relates to a color coated cellulosic substrate comprising a pigment filler and a binder of fully hydrolyzed polyvinyl alcohol having a 4 percent aqueous solution viscosity at 20° C. in the range of about 7.5 to 16 centipoises, said coating being essentially devoid of flow modifying agents and binder agents other than said polyvinyl alcohol.

The invention is based in part on the concept that transition from pseudoplastic to dilatant flow of aqueous polyvinyl alcohol coating colors may be extended to higher shear rates by employing fully hydrolyzed polyvinyl alcohol which is characterized by a critical 4 percent aqueous solution viscosity at 20° C. within the range of 7.5 to 16 centipoises.

The inventive concept extends to the use of increased solids contents in aqueous coating colors comprising fully hydrolyzed polyvinyl alcohol which is characterized by a critical 4 percent aqueous solution viscosity at 20° C. within the range of 7.5 to 16 centipoises.

DESCRIPTION OF THE DRAWING

The FIGURE is a log-log plot of viscosity-shear rate measurements for coating colors of the invention with polyvinyl alcohol viscosity (measured in a 4 percent aqueous solution at 20° C.) as a parameter.

DETAILED DESCRIPTION OF THE INVENTION

Polyvinyl Alcohol

As is well known, polyvinyl alcohol is prepared by the alcoholysis, saponification or hydrolysis of a polyvinyl ester such as polyvinyl acetate, so as to convert at least about 70 percent of the ester groups of the latter to hydroxyl groups. The extent to which such conversion is effected is commonly referred to as the degree of hydrolysis, which is frequently expressed as percent hydrolysis. A polyvinyl alcohol that is 99 to 100 percent hydrolyzed, i.e., 99 to 100 percent of the ester groups are converted to hydroxyl groups, is generally referred to as a fully hydrolyzed polyvinyl alcohol, while one that is hydrolyzed to a lesser extent is referred to as a partially hydrolyzed polyvinyl alcohol. Polyvinyl alcohols of various degrees of hydrolysis are available commercially in high, medium and low viscosity grades. The viscosity of a polyvinyl alcohol depends upon the degree of polymerization of the polyvinyl ester from which it was derived (the higher the degree of polymerization of the parent ester, the higher will be the viscosity of the polyvinyl alcohol).

Generally speaking, any of the commercially available polyvinyl alcohols, i.e., the high, low and medium viscosity grades of fully hydrolyzed and partially hydrolyzed polyvinyl alcohols, can be employed as pigment binders in the formulation of coating colors. In this regard, Colgan et al., infra, suggest the use of polyvinyl alcohol grades varying broadly from 55 to 100 percent hydrolysis and from 2 to 150 centipoises in viscosity, the latter measured in 4 percent aqueous solution at 20° C. While the prior art generally recognizes that specific applications might call for a particular viscosity grade or a particular degree of hydrolysis, there is no clear teaching with respect to coating color applications involving very high shear rates, e.g., of the order of $10^5$ sec.$^{-1}$.

It has been found that the full economic potential offered by modern high-speed paper making machinery cannot be achieved by utilizing the more typical commercial binders, such as the natural or nonsynthetic binders, e.g., starch. On the other hand, no significant improvement in rheological properties has been attributed by the prior art to the use of a synthetic binder, such as polyvinyl alcohol, in coating colors. Colgan et al., infra, merely disclose that their polyvinyl alcohol binders exhibit rheological properties typical of Newtonian and shear-thinning fluids and solids-viscosity relationships similar to colors prepared from the more typical commercial binders, no suggestion being made that any particular binder is atypical with respect to the rheology of coating colors prepared therefrom. Nippon Gosei, infra, and Kurashiki Rayon, infra, do not offer any suggestions regarding the effect of polyvinyl alcohol on the rheology of coating colors.

In the coarse of the investigation leading to the present invention, it was found that the rheological properties of coating colors could be significantly improved by utilizing as the sole pigment binder polyvinyl alcohol having a 4 percent aqueous solution viscosity at 20° C. in the very narrow range of 7.5 to 16 centipoises, preferably 10 to 14 centipoises. In particular, it was found that these polyvinyl alcohols could be employed as the sole pigment binder in coating colors for the coating of cellulosic substrates, such as paper web, at high-speed coating operations where the rate of shear of the coating colors is of the order of $10^5$ sec.$^{-1}$. The polyvinyl alcohols of the invention are unique in their ability to significantly advance the shear rate level at which transition from pseudoplastic to dilatant flow is evidenced. The advance constitutes essentially a full order of magnitude since coating colors presently employed in the paper making industry experience dilatant flow generally at shear rates of the order of $10^4$ sec.$^{-1}$. This advance, to a shear rate value exceeding $1.1 \times 10^5$ sec.$^{-1}$, can be translated readily with modern high-speed machinery to more practical coating operations. Alternatively, since dilatancy is a function of the solids content of coating colors, the invention permits the use of higher solids contents reflecting economies in drying procedures and equipment.

Coating Colors

In the preparation of a coated cellulosic web, e.g., a paper web, it is conventional practice to form a mixture of water and a pigment, such as clay or the like, sometimes with other materials such as, for example, a soluble pyrophosphate salt which may act as dispersing and stabilizing agent. This mixture, commonly termed a pigment "slip," or, since it usually contains clay, a clay "slip," is then compounded with a binder or adhesive material to produce a composition known in the art as a coating "color," which is useful for coating a cellulosic substrate, e.g., a paper or paperboard web. Substantial quantities of the binder are used, and, accordingly, the composition and characteristics of the binder are of great importance in determining the qualities of the finished coated web. It is important that the binder impart to the coating color or to the finished coated web a high degree of brightness, smoothness and gloss, and a good finish and feel after calendering. In addition to these basic qualities required in coatings, there are several other desired characteristics, e.g., the coating color must flow smoothly and evenly so that it can be applied to the cellulosic web at sufficiently high speeds to be economical in ordinary coating processes and the coating must be high strength, to permit subsequent printing on the coated paper without "picking."

The preferred pigment or filler of the slip employed in preparing the coating colors of the invention comprises clay. In this regard, any of the conventional clays customarily used for coating paper is suitable, including the hydrous aluminum silcates of kaolin group clays and hydrated silica clays.

In addition to clay itself, there may be utilized other paper filling compositions and materials such as, for example, calcium sulfate, titanium dioxide, blanc fixe, lithopone, zinc sulfide, zinc oxide, or other coating pigments in various ratios, e.g., up to 50 percent by weight of the clay. As previously indicated, the slip may also contain a small amount, e.g., 0.1 to 0.50, of a dispersing or stabilizing agent such as tetra-sodium pyrophosphate. The modification of the coating color using these materials will be within the knowledge of those skilled in the art.

The coating compositions, i.e., the "colors" of this invention can be prepared by any of the several known techniques. The usual method involves separately dissolving the polyvinyl alcohol in water and then combining the resulting solution with the pigment slip.

Polyvinyl alcohol solutions may be made by adding the dry polyvinyl alcohol to well agitated water. The temperature may then be brought to 200° F. and retained there until dissolution occurs, e.g., for 20 to 30 minutes.

While it is still warm the polyvinyl alcohol solution is combined with the clay slip. Pigment "shock" can sometimes occur while preparing colors. The employment of the lowest practicable solids polyvinyl alcohol solution, the combination of slip and solution while the latter is quite hot, the addition of the slip to the polyvinyl alcohol solution (rather than the reverse order of addition), and the addition of a small amount of tetrasodium pyrophosphate to the polyvinyl alcohol solution — although not necessary procedures — all tend to minimize the possibility of shock. The addition of surfactants to the polyvinyl alcohol solution is another procedure for eliminating shock.

The relative proportions of the several components of the coating color composition of this invention may vary to suit individual requirements, but in all cases the polyvinyl alcohol constitutes the sole binder for the clay or other filler and the color composition is otherwise devoid of flow modifying agents and other binder agents. In general, the coating colors of the invention have the following composition:

| Component | Parts by Weight |
| --- | --- |
| Pigment (e.g., clay) | 100 |
| Dispersing Agent | Up to 0.5 |
| Polyvinyl Alcohol (i.e., 4 percent aqueous solution viscosity at 20° C. of 7.5 to 16 centipoises, preferably 12 to 14 centipoises) | 3 to 12 |
| Water | Sufficient to provide solids content of 35 to 60 percent by weight |

For optimum results in the coating of paper or paperboard, it is preferred to prepare a coating color having a total solids composition which is relatively high, thus providing good surface coating qualities and economical operation. A suitable range of total solids for the coating color is between about 35 and 60 percent solids with a preferred range of about 45 to 55 percent. A color composition containing an amount of total solids and the polyvinyl alcohol binder of the invention as specified is characterized by being readily applied to the surface of the paper and by forming a highly resistant coating thereon. Thus, utilizing the coating color according to this invention, there is produced a pigment coated paper which is highly satisfactory for use in printing operations, particularly letterpress operations, and is resistant to disturbance of the pigment-coating surface through rubbing, picking, and the like.

The improved coating colors of this invention are applied to the fibrous web to be coated by any convenient means. Preferably, however, they are applied by means of a coating device of the type known in the art as a trailing blade coater, in which a pool of the coating composition is maintained in the bight between a backing roll around which the paper travels, and a flexible blade, one end of which extends close to the paper on the backing roll and meters the flow of the coating composition to the paper.

The coating composition performs well on roll coaters, air knife coaters and on blade coaters, and in the latter cases speeds in excess of 2,000 f.p.m. are involved. Also, other types of drying systems are suitable.

EXAMPLE 1

A pigment slip was prepared containing 150 parts of a No. 2 grade coating clay, 64 parts of water, and 0.2 part of tetrasodium pyrophosphate. The mixture was agitated on a high shear mixing device for thirty minutes. To this 70 percent pigment slip were added 42 parts of water and 9 parts of polyvinyl alcohol. The polyvinyl alcohol employed ranged in viscosity (i.e., as determined in 4 percent aqueous solution at 20° C.) from 7.5 to 30 centipoises. All of the polyvinyl alcohol polymers were fully hydrolyzed to contain less than 1.5 percent residual acetate groups. The mixture was heated to 190° F. accompanied by stirring. After thirty minutes the coating colors were colled to 125° F. and coated on two sides on paper having a basis weight of 28 pounds/3,300 square feet. The applied coating weight was 7 pounds/3,300 square feet. The coated paper was supercalendered at 1,100 pounds per lineal inch and 175° F.

The viscosity-shear rate relationships for the polyvinyl alcohol polymers used in this example were determined using a capillary extrusion viscometer. Depicted in the drawing are curves representing coating colors containing these polyvinyl alcohol polymers as the sole binder in the pigmented coating. It is seen from these curves that colors having 4 percent solution viscosities of 17 centipoises and up become dilatant at shear rates no higher than $1.1 \times 10^5$ sec. sec.$^{+1}$.

The paper coating properties for these coatings are listed in Table 1. The Dennison wax pick was measured in the standard manner to provide a measure of the strength of paper coating, a value of 8 or higher being indicative of good bond strength.

Printability of the coated paper depends on the degree to which the printing ink is retained on the surface of the coated paper. This degree of retention can be measured by using two test procedures. The first of these measures the resistance of paper to printing ink and is reported as the percent K&N. More particularly, this test indicates the rate of absorption of printing ink at the surface of the paper. This was measured using TAPPI Routine Control Method RC-19. The percent K&N values listed are the percent brightness retention of the stained area which relates directly to ink holdout, the minimum acceptable value being 55. The second test procedure for measuring printability is termed the gloss ink holdout test and measures the extent to which a printing ink will remain on the printing surface. This was measured by applying a gloss testing ink (Orange Gloss Testing Ink, International Printing Ink Co.) to a test strip of coated paper using an IGT printability Tester. The ink film was allowed to dry and the specular gloss at 75° was measured and the value compared with the original sheet gloss.

TABLE 1

EVALUATION OF COATED PAPER

| Polyvinyl Alcohol Viscosity* (centipoises) | Dennison Wax Pick | % K&N | Gloss Ink Holdout % |
| --- | --- | --- | --- |
| 30 | 8 | 63.1 | 172 |
| 19 | 8 | 61.7 | 148 |
| 17 | 8 | 61.7 | 139 |
| 12 | 8 | 58.9 | 121 |
| 7.5 | 7 | 56.2 | 82 |

* determined in 4 percent aqueous solution at 20° C.

EXAMPLE 2

A 10-gallon Kaddy mill was charged with coating clay (20,000 parts), Tamol 850 (30 percent solids, 140 parts), calcium stearate (60 parts) and water (8,571 parts). The mixture was agitated at 6,000 r.p.m. for 10 minutes and polyvinyl alcohol (4 percent aqueous solution viscosity at 20° C. being 30 centipoises) (800 parts) was then slurried into the cold dispersion over approximately 10 minutes.

After the addition was complete, water (18,950 parts) was added and the coating color (52.3 percent solids) heated to 190° F. and held at this temperature for 30 minutes.

The color was cooled to 80° F. and applied to a raw stock having a basis weight of 25 pounds/3,300 square feet at 1,500 feet/minute using a trailing blade coater. The coating head arrangement was the flooded nip trailing blade type. Considerable solid buildup on the back of the blade was accompanied by feathering at the blade/paper interface. At the maximum blade pressure attainable (15 p.s.i.), the minimum coating applied was 6.9 pounds/3,300 square feet on one side of the paper. In addition, the coating operation rapidly became inoperable due to the buildup on the blade. The coating itself was unsatisfactory because of scratches and unacceptable roughness.

Under the same operating conditions of color solids, machine speed, blade pressure, etc., colors based on polyvinyl alcohol having a 4 percent aqueous solution viscosity at 20° C. of 13 centipoises did not exhibit solid buildup or feathering and resulted in the smooth application of much lower coating weights (4 pounds/3,300 square feet).

I claim:

1. An aqueous coating color characterized by pseudoplastic flow at shear rates of the order of $10^5$ sec.$^{-1}$ comprising a pigment filler and a binder thereof, wherein said binder consists of polyvinyl alcohol characterized by a degree of hydrolysis of at least about 99 percent and by a 4 percent aqueous solution viscosity at 20° C. in the range of about 7.5 to 16 centipoises.

2. The aqueous coating color of claim 1 wherein the viscosity of said binder is in the range of 12 to 14 centipoises.

3. A coating color according to claim 2 wherein said pigment filler is clay.

4. A coating color according to claim 3 including a dispersing agent.

5. A coating color according to claim 4 wherein said dispersing agent is tetrasodium pyrophosphate.

6. A coating color according to claim 5 having a total solids content of 35 to 60 percent by weight.

7. In a method for applying a coating color comprising a clay filler and a polyvinyl alcohol binder to a cellulosic substrate, the improvement for permitting application at a shear rate exceeding $1.1 \times 10^5$ sec.$^{-1}$, comprising employing as said binder polyvinyl alcohol having a 4 percent aqueous solution viscosity at 20° C. in the range of about 9 to 16 centipoises and a degree of hydrolysis of at least about 99 percent.

* * * * *